Aug. 30, 1966   T. J. STOY   3,269,070
REFRACTORY LINER BRICK WITH TONGUE AND COMPOUND GROOVE FOR
FORMING CIRCULAR TAPERED FURNACE STACK CONSTRUCTIONS
Filed Sept. 11, 1963                                 2 Sheets-Sheet 1

INVENTOR.
THOMAS J. STOY
BY
William C. Mealer
ATTORNEY

Aug. 30, 1966 T. J. STOY 3,269,070
REFRACTORY LINER BRICK WITH TONGUE AND COMPOUND GROOVE FOR
FORMING CIRCULAR TAPERED FURNACE STACK CONSTRUCTIONS
Filed Sept. 11, 1963 2 Sheets-Sheet 2

INVENTOR.
THOMAS J. STOY
BY
William C. Mealer
ATTORNEY

United States Patent Office 3,269,070
Patented August 30, 1966

3,269,070
REFRACTORY LINER BRICK WITH TONGUE AND COMPOUND GROOVE FOR FORMING CIRCULAR TAPERED FURNACE STACK CONSTRUCTIONS
Thomas J. Stoy, Clearfield, Pa., assignor to Harbison-Walker Refractories Company, Pittsburgh, Pa., a corporation of Pennsylvania
Filed Sept. 11, 1963, Ser. No. 308,290
6 Claims. (Cl. 52—249)

The present invention relates to stack liner construction and, in particular, to structure and arrangement of refractory brick suitable for use in fabrication of such liners.

Heretofore, various sizes and shapes of refractory have been employed in furnace construction and, in particular, in the construction of furnace stack linings. The brick were of various sizes and shapes. Prior stack construction required that the brick be layed up with mortar or cement to provide a sufficient degree of permanence and rigidity, and to prevent penetration of the walls with harmful and noxious gases. When operations were periodically shut down, acids forming as a result of reaction between atmospheric moisture and residual material deposited in the stack by flue gases passing thereover caused the mortar or cement to heave, thus, undesirably allowing brick to dislodge.

An object of the present invention is to provide an improved refractory lining construction.

Another object of the invention is to provide an improved arrangement of refractory brick in furnace stack construction.

A further object of the invention is to provide an improved brick shape, a plurality of which may be employed for building tapered refractory stack linings.

Still another object of the invention is to provide for improved furnace stack construction, without use of adhesive or mortar between refractory brick used to fabricate the stack.

Briefly, according to one aspect of this invention, a novel brick shape is provided. It is elongate and of generally arcuate configuration, with opposed long sides describing parallel curves. Opposed ends, and the top and bottom faces, are shaped to polarizing configurations to assure proper placing when fabricating a stack. The brick portions which provide the polarizing configuration are, further, specially formed, to allow use of a plurality of identical brick to fabricate a tapered stack.

In order to more fully understand the nature and scope of the invention, reference should be had to the following detailed description and drawings of which:

The shapes of the invention may be composed of any desired material, and may be produced by any of the methods well known in the art. For example, they can be made of fire clay, silica, alumina, basic refractory, etc. They can be made by power pressing, vibration forming techniques, slip casting, etc.

For convenience, the projection and recess located on opposed faces of the brick will be hereafter referred to as "face tongue" and "face groove," and the projection and recess on the ends of the brick will hereafter be referred to as "end tongue" and "end groove."

A feature of the invention is that a tapered stack lining may be fabricated of a plurality of identical brick. The radius of the face tongue is a mean curve, drawn coincident with the mean curve radius of a stack of a given height. The face groove is a combination of grooves coincident with the maximum and minimum radii of a given stack lining. The face groove is narrower at the middle than at the ends, to allow rocking and play between successive tiers or rings of brick in construction of a given stack. The end tongue and groove are so designed as to maintain approximately 50% surface area contact with successive identical brick in a common ring, while allowing horizontal rocking therebetween to obtain a desired curve or diameter. Thus, a given change of radius is obtained merely by wiggling the ends of sequentially laid brick in a horizontal plane.

Another feature of the invention is that the brick may be stacked without the use of an adhesive, such as mortar or cement. However, it is suggested that a steel band be used about the stack every four vertical feet or so to hold the brick in position. The elimination of the mortar, itself, presents a tremendous saving in materials, cost and labor.

The refractory brick of the invention are particularly useful, for example, in the construction of coke oven stacks, ranging up to about 200 ft. in height, and power plant stacks which range, for example, up to 450 ft. in height.

Where protection from gas penetration is important, it is desirable to dip the brick in a chemically inert, non-fusable, thin mortar slurry. Such dip joints still substantially reduce the mortar costs and labor previously occasioned.

Figure 1:
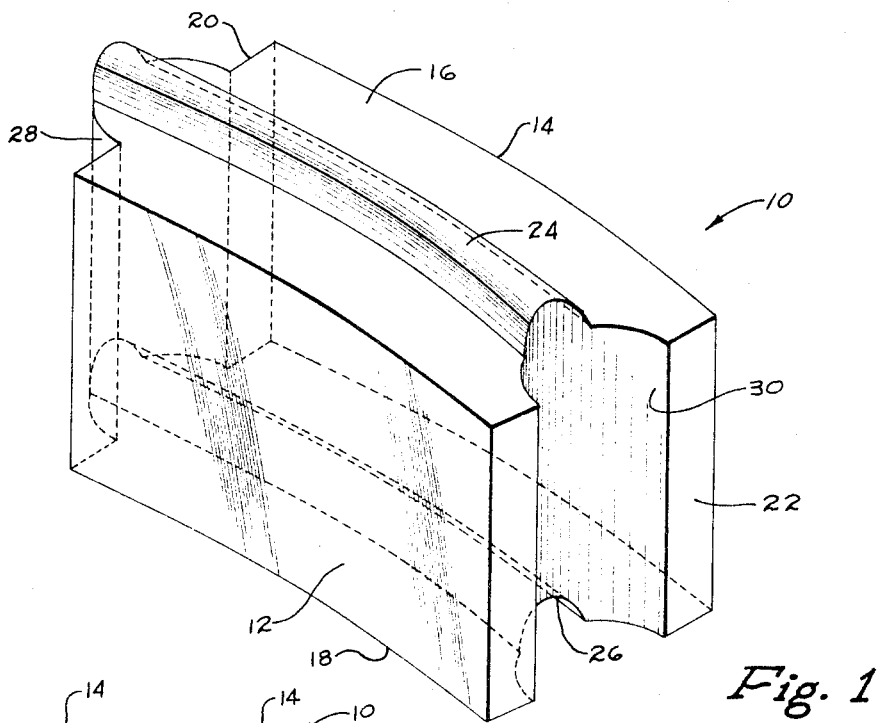
FIG. 1 is a perspective view of a refractory brick according to this invention.

Referring now to FIG. 1, there is shown an elongate brick 10 of this invention for use in linear construction. The body of the brick can be generally described as that which would be obtained if a rectangular shape were bent through a plane parallel to its top and bottom faces. The brick 10 has a concave side surface 12 and an opposed parallel convex side surface 14, faces 16 and 18, and ends 20 and 22. From face 16 there extends a projection or tongue 24, and in face 18 there is formed a recess or groove 26. From end 20, there extends a tongue 28, and in end 22 there is formed a recess or groove 26. Both tongues 24 and 28 and recesses or grooves 26 and 30 are substantially equidistant with respect to the faces 12 and 14.

By way of example only, the shape 10 of FIG. 1 can measure 8″ in length along the convex edge 14, and 7½″ in length along the concave edge 12. The longitudinal centerline radius of curvature is approximately 5 ft. The width of the shape is approximately 3¾", and the vertical thickness is approximately 4½". The radius of the end tongue 28 is about 1" and for end groove 30 is approximately 1 1/32". The radius for groove 30 is measured from a point removed about 1/32" from the end of the shape in which it is formed. The radius of the face tongue 24 is ½", and the face recess or groove 26 measures on the order of 9/16" radius at its narrowest center point. The groove 26 is a compound groove. For example, a groove of constant cross sectional dimension is formed with its center line coincident with an arc having a diameter the same as a minimum stack diameter. A second groove is formed, of precisely the same cross sectional dimension as the first one, but its center line is coincident with an arc having a diameter the maximum diameter of the proposed stack. The two grooves are coincident at the lateral center line of the shape. When the shape is to be made on a mechanical press, it is desirable that the longitudinal edges of groove 26 be widened slightly to facilitate removal from the press cavity.

Figure 2:
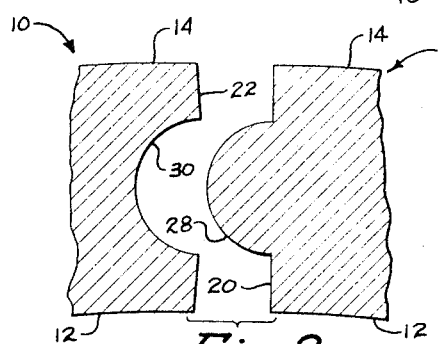
FIG. 2 is a fragmentary plan view of the interlocking end portions of a pair of identical brick.
Figures 3, 4:
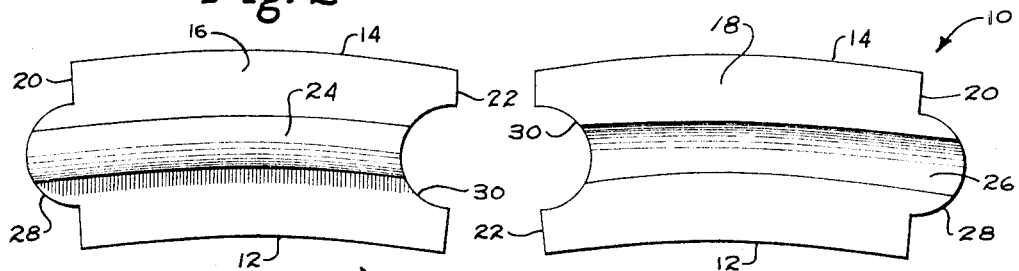
FIG. 3 is a bottom view of the brick of FIG. 1.
FIG. 4 is a top view of the brick of FIG. 1.

With reference to FIG. 2, there is shown fragmentary end portions of a sequential pair of brick and in which end tongue 28 is about to be moved into an end groove 30. The brick 10 are designed to maintain about 50% surface area contact between tongue 28 and groove 30 when they are moved together, and to maintain this degree of contact when the brick are horizontally adjusted relative to each other. This horizontal adjustment can be accomplished because tongues 28 and grooves 30 have approximately the same radius but, as noted in the preferred dimensional embodiment set forth above, the groove 30 is somewhat shallow. Also, the edge portions 22, adjacent the groove, are canted slightly to the rear, i.e. about 1/16" in 1⅜". The edge portions 20, adjacent either side of tongue 30, are substantially at right angles with respect to the vertical bisector of said tongue.

Figure 5:
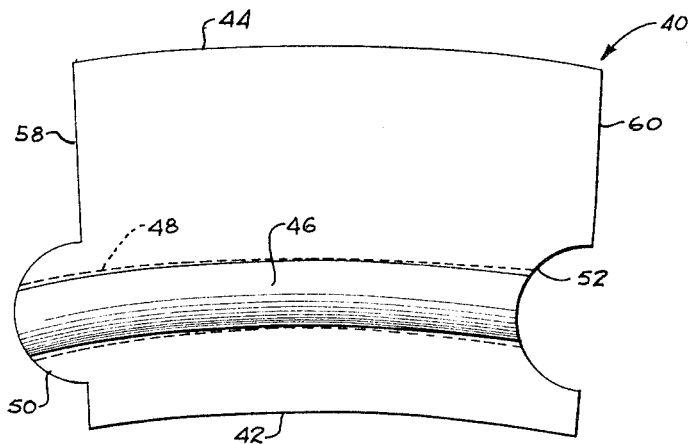
FIG. 5 is a top view of a modified refractory brick according to this invention.

Referring to FIG. 5, there is shown a modified brick or shape according to this invention. The shape 40 contains, as in FIG. 1, concave and convex edges 42 and 44, respectively, a face tongue and groove 46 and 48, respectively, and an end tongue and end groove 50 and 52, respectively. The primary difference between this shape and that of FIG. 1 is it is of greater width, and the tongues 46 and 50 and grooves 48 and 52 are off center, closely adjacent the concave edge 42.

Figure 6:
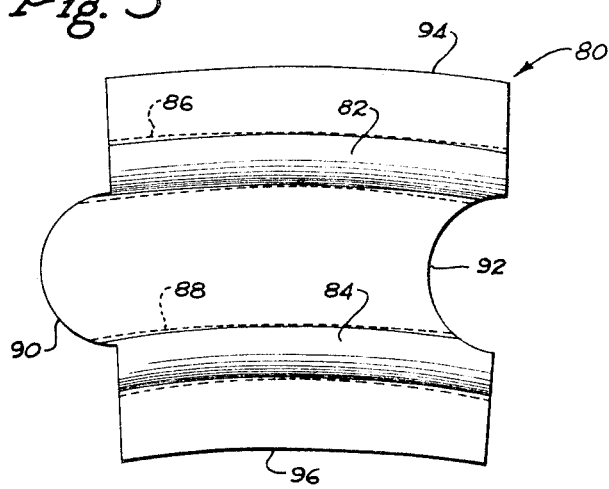
FIG. 6 is a view showing a further modification of the refractory brick of the invention.
Figure 7:
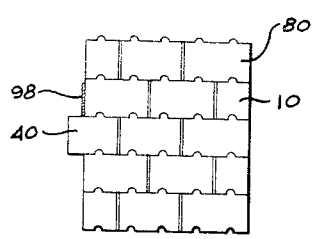
FIGS. 7 through 12 are schematic side elevational views of refractory stack lining of various thicknesses employing the refractory brick of the present invention.
Figure 8:
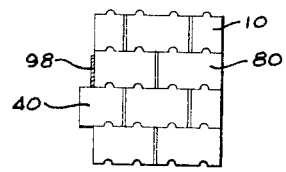
Figure 9:
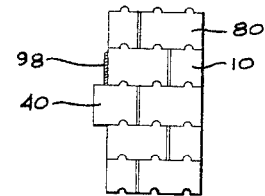
Figure 11:
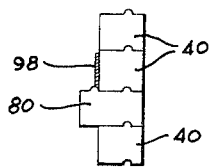
Figure 12:
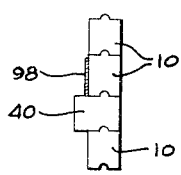
Figure 10:
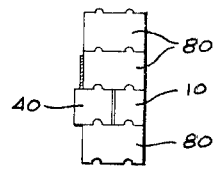

Referring to FIG. 6, there is shown still a further modification of the refractory brick according to this invention. Refractory shape 80 is of substantially greater width than either refractory shape 10 or refractory shape 40. Shape 80 has two face projections or tongues 82 and 84 and recesses or grooves 86 and 88. The shape 80 has one end tongue 90 and one end groove 92. The longitudinal center line is substantially equidistant between the concave and convex sides.

Referring to FIGS. 7 through 12, there is shown a series of different wall constructions fabricated with refractory shapes of the present invention. It should be noted that various of the refractory shapes 10, 40 or 80 can be combined. Note, also, that shape 40 can extend beyond the other shapes (10 and/or 80, for example) to provide support for a band member 98 disposed at vertical intervals.

Broadly, all of the brick discussed above include a combination of face and end tongues and grooves, which serve as means to polarize the brick to assure proper disposition in successive rings and relative to each other in a common ring. This polarizing combination, still further, is constructed and arranged to allow limited rotating in a horizontal plane about a brick center point.

This "center point" is, of course, the point of arcuate coincidence between the maximum and minimum diameter grooves formed in the bottom face of the brick.

While the invention has been described with reference to particular embodiments and drawings, it will be understood, of course, that modifications, substitutions, and the like may be made therein without departing from its scope.

I claim:

1. As an article of manufacture, a refractory shape arranged to be used with a plurality of identical shapes to form a tapered circular wall, said shape being elongate and of generally arcuate configuration with opposed long sides describing parallel curves, opposed ends, and parallel top and bottom faces extending between said curved sides and opposed ends to define the shape, a combination of one face and an adjacent end including cooperating means arranged to polarize the shape, said cooperating means which polarize the shape being of the tongue and groove type, and in which at least one tongue extends lengthwise across the upper face and down an adjacent end, and at least one groove extending lengthwise across the bottom face and up the other end of the opposed ends, the respective grooves and tongues having respective center lines parallel to a pair of opposed edges where the respective faces and ends join the curved long sides to form the shape, the groove in the bottom face of the shape being characterized by substantially identical cross sectional area at either end, the cross sectional area of a mid-point of this groove in the bottom face being smaller than that of the ends but slightly larger than the cross sectional area of the tongue on the upper face, said groove being a compound groove formed by two grooves intersecting at substantially the center point of said bottom face, the vertical bisector of each groove having a diameter of different length, the vertical bisector of the tongue on the upper face having a diameter which is the mean of the diameters of the vertical bisectors of the compound bottom groove thereof, whereby a plurality of identical shapes may be stacked in successive rings to form a curved wall in which shapes in these successive rings may be rotated on the top face of shapes in the next lower supporting ring, the rotation being only in a plane parallel to the bottom face and about said mid point of the groove in the bottom face of said shape which is of smaller cross sectional area than the ends of said groove, and the degree of rotation of the shape being limited by the cross sectional area of the ends of said groove in the bottom face, the respective tongue and groove portions of the ends of said article so dimensioned that the tongue of another identical shape can be encompassed within the end groove of a successive identical shape in forming a ring of a circular wall while allowing said limited rotation of one shape relative to the next, the respective end tongue and end groove of said shape being so dimensioned as to assure on the order of about a 50% area contact between the outer face of the tongue and the inner wall of the shape which defines the end groove in all positions during said limited horizontal rotation, and the surface areas adjacent either side of the end tongue being rearwardly sloped to assist in maintaining said 50% area contact during said limited horizontal rotation.

2. The article of claim 1 in which the tongue of the upper face and the groove of the bottom face is closer to one curved side than the other.

3. The article of claim 1 in which there are a plurality of tongues on the upper face and a plurality of corresponding grooves in the lower face.

4. A shape of refractory material, said shape being of generally arcuate configuration with opposed long sides describing parallel curves, opposed ends, top and bottom parallel faces extending between said curved sides to define the shape, means to polarize the shape to assure proper disposition when said shape is used in relation to other similar shapes in fabricating a structure, said polarizing means constructed and arranged to allow limited rotation of the shape in a horizontal plane about a predetermined mid-point between the opposed ends, said polarizing means being of the tongue and groove type in which a tongue extends lengthwise of the upper face and down an adjacent end, and the groove extends lengthwise of the bottom face and up the other end of said opposed ends, said groove extending lengthwise of the bottom face being a compound groove formed by two grooves intersecting at substantially the center point of said bottom face, the vertical bisector of each groove having a diameter of different length.

5. The shape of claim 4 in which the vertical bisector of the tongue of the upper face has a diameter which is the mean of the vertical bisectors of the compound bottom groove.

6. The shape of claim 4 in which at least a portion of the opposed ends slope outwardly away from the adjacent long sides.

References Cited by the Examiner

UNITED STATES PATENTS

| | | | |
|---|---|---|---|
| D. 30,288 | 2/1899 | Vrooman | 52—57 X |
| 86,796 | 2/1869 | Absterdam | 52—245 |
| 418,209 | 12/1889 | Poock et al. | 52—575 |
| 1,497,141 | 6/1924 | Hart | 52—224 X |

FOREIGN PATENTS

| | | |
|---|---|---|
| 60,503 | 1/1943 | Denmark. |
| 14,328 | 10/1884 | Great Britain. |

FRANK L. ABBOTT, *Primary Examiner.*

A. C. PERHAM, *Assistant Examiner.*